United States Patent [19]

Berg et al.

[11] 4,421,388
[45] Dec. 20, 1983

[54] ACOUSTO-OPTIC TIME INTEGRATING FREQUENCY SCANNING CORRELATOR

[75] Inventors: Norman J. Berg; Irwin J. Abramovitz, both of Baltimore; Michael W. Casseday, Greenbelt; John N. Lee, Silver Spring, all of Md.

[73] Assignee: The United States of America as represented by the Secretary of the Army, Washington, D.C.

[21] Appl. No.: 251,605

[22] Filed: Apr. 6, 1981

[51] Int. Cl.³ .............................................. G02F 1/11
[52] U.S. Cl. ..................................... 350/358; 333/150
[58] Field of Search .................... 350/358, 169, 96.14; 235/181; 333/150

[56] References Cited

U.S. PATENT DOCUMENTS 4,110,016  8/1978  Berg et al. ............................ 350/358
4,139,277  2/1979  Berg et al. ............................ 350/358
4,326,778  4/1982  Berg et al. ............................ 350/358

OTHER PUBLICATIONS

"Time Integrating Acousto—optic correlator"; Sprague et al. *App. Opt.*, vol. 15, No. 1 Jan. 1976.

Primary Examiner—William L. Sikes
Assistant Examiner—Léon Scott
Attorney, Agent, or Firm—Robert P. Gibson; Anthony T. Lane; Saul Elbaum

[57] ABSTRACT

An acousto-optic time integrating two-dimensional frequency scanning correlator for cross-correlating signals which are separated in frequency. Two coherent light beams which are derived from the same laser are fed across respective Bragg cells, one cell having the signal $A(t) \cos \omega_A t$ propagating thereacross and the other cell having the signal $B(t) \cos \omega_B t$ propagating thereacross. The respective output beams are comprised in the x direction and expanded in the y direction and are made incident on an acousto-optical correlator device having chirp signals counter-propagating thereacross. The optical output is fed to a time-integrating photodiode array which provides an output signal corresponding to the cross-correlation of $A(t)$ and $B(t)$. In a further embodiment, the two Bragg cells are replaced by a single Bragg cell and beams having different polarizations are fed thereacross. In a still further embodiment, only a single crystal is used which has the $A(t)$ and $B(t)$ signals, as well as the chirp signals, counter-propagating thereacross.

8 Claims, 7 Drawing Figures

ACOUSTO-OPTIC TIME INTEGRATING FREQUENCY SCANNING CORRELATOR

The invention described herein may be manufactured, used, and licensed by or for the United States government for governmental purposes without the payment to us of any royalty thereon.

The present invention is directed to a surface wave, acousto-optic two-dimensional frequency scanning correlator.

As is known, the correlation function serves many useful purposes in the processing of radar and communication signals. Specifically, it is most useful when attempting to extract weak signals from a noisy environment, such as radar return signals, and in the process of synchronizing a spread spectrum communications system.

The gain of a signal processing system is essentially proportional to the time-bandwidth product thereof, where time refers to the integration time, and this product is a figure of merit of a processor. The interaction time, which may be different than the integration time, is the specific time window which is being simultaneously integrated, and in general, it is desirable to maximize the interaction time as well as the time-bandwidth product.

In copending U.S. patent application Ser. No. 148,653 and now U.S. Pat. No. 4,326,778, filed May 12, 1980, an acousto-optic time integrating correlator having a relatively high time bandwidth product as well as a relatively long interaction time is disclosed. While being an improvement, the device disclosed in copending Application No. 148,653 is limited, when it is used as a cross-correlation signal detector, by any difference between the reference carrier frequency and the input signal carrier frequency. For example, it has been calculated that for a 30 ms integration time, the device is limited to processing signals which are separated by less than 200 Hz. However, it is frequently necessary to cross-correlate signals of greater frequency separation, for example, in a radar system where the return radar signal is Doppler-shifted by reflection off of a moving target.

It is thus an object of the invention to provide a correlator which is capable of correlating signals which are substantially separated in frequency.

It is a further object to correlate such signals while still achieving a relatively long integration time as well as a relatively large processing gain.

It is a further object of the invention to provide an acousto-optic time integrating frequency scanning oscillator which is useful in a low probability of intercept (LPI) radar system.

The invention will be better understood by referring to the accompanying drawings, in which.

THE ONE-DIMENSIONAL TIME-INTEGRATING CORRELATOR

Figure 1:
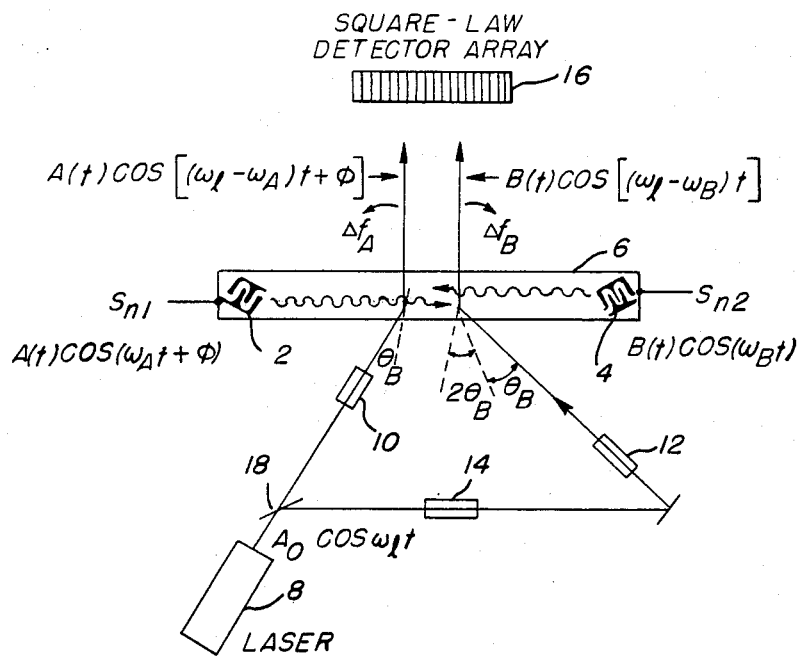
FIG. 1 is a schematic representation of the acousto-optic time integrating correlator disclosed in Ser. No. 148,653.

FIG. 1 illustrates the operation of the two-beam surface acoustic wave acousto-optic correlator disclosed in co-pending U.S. application Ser. No. 148,653 and now U.S. Pat. No. 4,326,778. By way of background, U.S. Pat. Nos. 4,110,016, 4,139,277 and 4,024,280, also relate to acousto-optic devices, and are incorporated herein by reference.

In FIG. 1, a surface acoustic wave delay line is used in a configuration for obtaining convolution and correlation with acoustic-optic devices. The transducers 2 and 4 on the delay line 6 are fabricated so that they are tilted from the perpendicular to the z-axis of the delay line, which is y-cut, z-propagating lithium niobate, by $\theta_{Bn}$, the Bragg angle in the delay line material at the correlator design center frequency $\omega_o$. The relative tilt between the transducers is $2\theta_{Bn}$. The correlator input signals, $A(t) \cos \omega_A t$ and $B(t) \cos \omega_B t$, generate counter-propagating surface acoustic waves which interact with two sheet beams of laser light that are projected into the top side and along the top surface of the delay line. The beams are derived from a single laser 8. The light output of the laser is split into two beams which are then shaped by beam expanders 10 and 12, phase equalized by E-O phase modulator 14, and projected into the delay line with an angle $4\theta_B$ between them. Here $\theta_B$ is the Bragg angle in air for the frequency $\omega_o$.

Because of the strong angular dependence of the acousto-optic Bragg interaction, the right sheet beam shown in FIG. 1 interacts primarily with the surface acoustic wave launched by the right transducer. Similarly, the left beam interacts with the surface acoustic wave from the left transducer and cross terms can be held to $-40$ dB. The light that is Bragg-diffracted by the surface acoustic waves is imaged onto an integrating square-law detector diode array 6, and the spatial amplitude, frequency, and phase of this light can be (for equal, uniform-intensity sheet beams) described in idealized form by the equation $$L(t,Z) = A\left(t + \frac{Z}{v_a}\right) \cos\left[\omega_l t + \frac{\omega_l Z}{c/\sin \theta_i} - \omega_A\left(t + \frac{Z}{v_a}\right)\right] + B\left(t - \frac{Z}{v_a}\right) \cos\left[\omega_l t - \frac{\omega_l Z}{c/\sin \theta_i} - \omega_B\left(t - \frac{Z}{v_a}\right)\right] \quad (1)$$

Here $\omega_l$ is the light frequency, t is time, Z is the distance along both the delay line and the diode array (the center position is Z=0), $v_a$ is the acoustic propagation velocity, c is the free-space light velocity, and $\theta_i$ is the angle of incidence of the light beams. This angle, $\theta_i$, equals $2\theta_B$. The sine of the Bragg angle, $\theta_B$, equals the light wavelength divided by twice the acoustic wavelength (at the design acoustic frequency $\omega_o$); therefore, where $\omega_o$ is the design frequency, $\omega_i(\sin\theta_i)/c \approx \omega_o/v_a$. Note that equation 1 consists of two terms, one from each Bragg-diffracted light beam. Since both sheet beams originate from a single coherent source, the spatial phase terms in $Z/v_a$ in the diffracted light results in constructive and destructive interference of the light diffracted onto the diode array by the two surface acoustic waves. The diodes form the square of the sum of the amplitudes, yielding an output current $$I(t,Z) = A^2\left(t + \frac{Z}{v_a}\right)\cos^2\left(\omega_l t + \frac{\omega_o Z}{v_a} - \omega_A\left[t + \frac{Z}{v_a}\right]\right) + B^2\left(t - \frac{Z}{v_a}\right)\cos^2\left(\omega_l t - \frac{\omega_o Z}{v_a} - \omega_B\left[t - \frac{Z}{v_a}\right]\right) + \qquad (2)$$

$$2A\left(t + \frac{Z}{v_a}\right)B\left(t - \frac{Z}{v_a}\right)\cos\left(\omega_l t + \frac{\omega_o Z}{v_a} - \omega_A\left[t + \frac{Z}{v_a}\right]\right)\cos\left(\omega_l t - \frac{\omega_o Z}{v_a} - \omega_B\left[t - \frac{Z}{v_a}\right]\right)$$

The cross product term in equation 2 may be manipulated using the appropriate trigonometric identity to yield a difference frequency term, $$D(t,Z) = A\left(t + \frac{Z}{v_a}\right)B\left(t - \frac{Z}{v_a}\right)\cos\left([\omega_B - \omega_A]t + \frac{Z}{v_a}[2\omega_o - \omega_A - \omega_B]\right), \qquad (3)$$

and a sum frequency term, $$S(t,Z) = A\left(t + \frac{Z}{v_a}\right)B\left(t - \frac{Z}{v_a}\right)\cos\left(2\omega_l t - [\omega_A + \omega_B]t + \frac{Z}{v_a}[\omega_B - \omega_A]\right), \qquad (4)$$

The array time-integrates the detected signal (diode current) for a period T, yielding an output voltage for the difference term (equation 3) of $$V(T,Z) = \int_{|Z|/v_a}^{T - |Z|/v_a} A\left(t + \frac{Z}{v_a}\right)B\left(t - \frac{Z}{v_a}\right)\cos\left([\omega_B - \omega_A]t + \frac{Z}{v_a}[2\omega_o - \omega_A - \omega_B]\right)dt, \qquad (5)$$

where the integration limits are determined by the transit time delay. Equation 5 is recognized as the correlation of $A(t)\cos(\omega_o - \omega_A)t$ and $B(t)\cos(\omega_o - \omega_B)t$ in a compressed time frame.

The sum frequency term, equation 4, varies rapidly with time (at about $\cos[2\omega_l t]$) and the time integral of this term tends to zero for integration time $T \gg \frac{1}{2}\omega_l$. The integration of the $A^2$ and $B^2$ terms yields a "bias" output level on which the correlation term rides.

Figure 2:
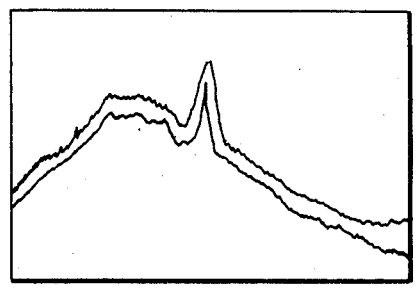
FIG. 2 is a graphical representation of the correlator output of the device of FIG. 1 for a direct sequence spread spectrum input with a carrier frequency at $\omega_o$.

FIG. 2 shows the output of the diode array when both delay line inputs consist of the same maximal linear pseudonoise code on a phase-shift-keyed (PSK) modulated carrier (a "direct-sequence" spread-spectrum signal). The carrier frequency was 187 MHz (the design center frequency), the minimum chip duration was 0.25 $\mu$s (a 4 Mbit code rate), the code length was $2^{16} - 1$ bits, and the integration time was 30-ms. Evaluating equation 5 for a PSK signal yields.

$$V(T,Z) = \cos\left(\frac{2Z}{v_a}[\omega_o - \omega_A]\right)\int_{|Z|/v_a}^{T - |Z|/v_a} A\left(t + \frac{Z}{v_a}\right)A\left(t - \frac{Z}{v_a}\right)dt \qquad (6)$$

When $\omega_A = \omega_o$, the output contains only the real part of the autocorrelation of the modulation (the direct sequence code) compressed in time by a factor of 2. The autocorrelation of a direct sequence code is a triangularly shaped function, as seen in FIG. 2, riding on a bias level which is due to the square terms. The amplitude variation of the bias level shown in this figure is caused by the Gaussian intensity profile of the sheet beams of light used in the devices.

Figure 3:
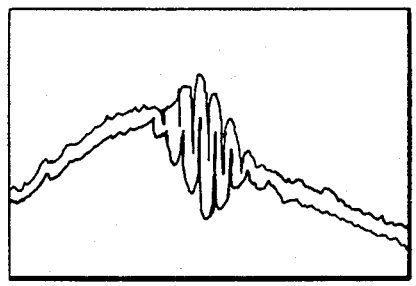
FIG. 3 is a graphical representation of the correlator output for a code input with a carrier frequency at $\omega_o + 1$ MHz.

When $\omega_A \neq \omega_o$, the output voltage from the array has an additional variation described by the $\cos(2Z/v_a[\omega_o - \omega_A])$ term in equation 6. This spatial "fringe pattern" results when the light beams diffracted by the surface acoustic waves are not parallel, which is the case when the input frequency is not equal to $\omega_o$. An example of this is shown in FIG. 3 where the carrier frequency of the direct sequence code is 1 MHz higher than $\omega_o$. By examining the spacing and sense of the fringes, one can determine the input-signal frequency relative to $\omega_o$ and find both the real and imaginary parts of the correlation.

The "bias/level" due to the square terms $(A^2 + B^2)$ may be removed with a high-pass filter or with the following scheme. Two integrations of the signals are performed with the phase of one of the delay line inputs changed by 180° (by using a double balanced mixer) for the second integration. This changes the sense of the second correlation output, which is then substracted from the first (using digital post-processing), doubling the amplitude of the correlation output and removing the bias level.

When one of the PSK signal inputs is delayed by a time $t_o$, the correlation output may be described by $$V(T,Z) = \cos\left(\omega_A t_o + \frac{2Z}{v_a}[\omega_o - \omega_A]\right) \int_{|Z|/v_a}^{T-|Z|/v_a} A\left(t + \frac{Z}{v_a}\right) A\left(t + t_o - \frac{Z}{v_a}\right) dt \quad (7)$$

which indicates that the position of the correlation peak on the diode array is shifted by an amount $\Delta Z = t_o v_a/2$.

$$V(T,Z) = \left(T - \frac{2|Z|}{v_a}\right) A^2 \cos\left(\frac{2Z}{v_a}[\omega_o - \omega_A] - \frac{Z}{v_a}[N-1]e_\omega\right) \frac{\sin\left(\frac{ZNe_\omega}{v_a}\right)}{N\sin\left(\frac{Ze_\omega}{v_a}\right)} \quad (9)$$

This displacement in location of the modulation correlation peak on the array is a direct measure of the time difference of arrival (TDOA) of the two signals. The 2.54-cm aperture of the present configuration (equivalent to 7 μs of delay) limits TDOA measurements to about ±7 μs (twice the time aperture).

In equation 7, the location of the fringe pattern under the correlation envelope is offset by a phase term $\omega_A t_o$. When $\omega_A = \omega_o$, there are no fringes and only the real part of the correlation is available, which results in zero output when $\omega_A t_o = \pi/2$. In the more usual case, $\omega_A \neq \omega_o$, and the $\omega_A t_o$ phase term (at $[2n+1]\pi/2$) changes the fringe pattern from cosine to sine, indicating the change in correlation from pure real to pure imaginary.

Figure 4:
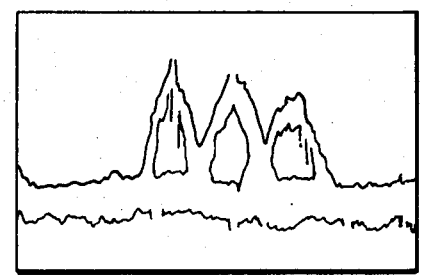
FIG. 4 is a graphical representation which illustrates a time difference of arrival determination.

FIG. 4 shows the shift in position of the correlation peak of a direct-sequence signal obtained by delaying one of the inputs to the correlator. The right corresponds to a 260 ns delay in the right signal, the central peak is for no delay, and the left peak results from a 260 ns delay in the left signal. The ability of the correlator to resolve TDOA is limited by the diode spacing of the detector array. Using an array with 1024 diodes in 2.54-cm results in a TDOA resolution limit of about 14 ns.

The correlator output for a simple "frequency hopper" spread-spectrum signal may be described as integration time T. Equation 8 can be evaluated, yielding Noting that $Ne_\omega = \Delta\omega$, the total hopper bandwidth, yields $$V(T,Z) = \left(T - \frac{2|Z|}{v_a}\right) A^2 \cos\left(\frac{2Z}{v_a}[\omega_o - \omega_A] - \frac{Z\Delta\omega}{v_a}\left[1 - \frac{1}{N}\right]\right) \frac{\sin\left(\frac{Z\Delta\omega}{v_a}\right)}{N\sin\left(\frac{Z\Delta\omega}{Nv_a}\right)} \quad (10)$$

The Two-Dimensional Frequency Scanning Correlator of the Invention

As mentioned above, the useful integration time of the two beam correlator that has been described above is limited when it is used as a cross-correlation signal detector by any difference between the reference carrier frequency and the input signal carrier frequency. This limit can be estimated by examining the correlator response to two single-frequency cw signals, $\cos \omega_A t$ and $\cos \omega_B t$. From equation 5 one obtains $$V(T,Z) = 2\left(T - \frac{2Z}{v_a}\right) \cos\left(\frac{Z}{v_a}[2\omega_o - \omega_A - \omega_B] + \left[\frac{\omega_A + \omega_B}{2}\right]T\right) \frac{\sin\left(\left[\frac{\omega_B - \omega_A}{2}\right]T\right)}{\left(\frac{\omega_B - \omega_A}{2}\right)T} \quad (11)$$

When the frequency difference, $\omega_B - \omega_A$, is equal to $2\pi/T$, the output goes to zero because of the sinc term. For a 30-ms integration time, this corresponds to about a 200-Hz frequency difference.

Figure 5:
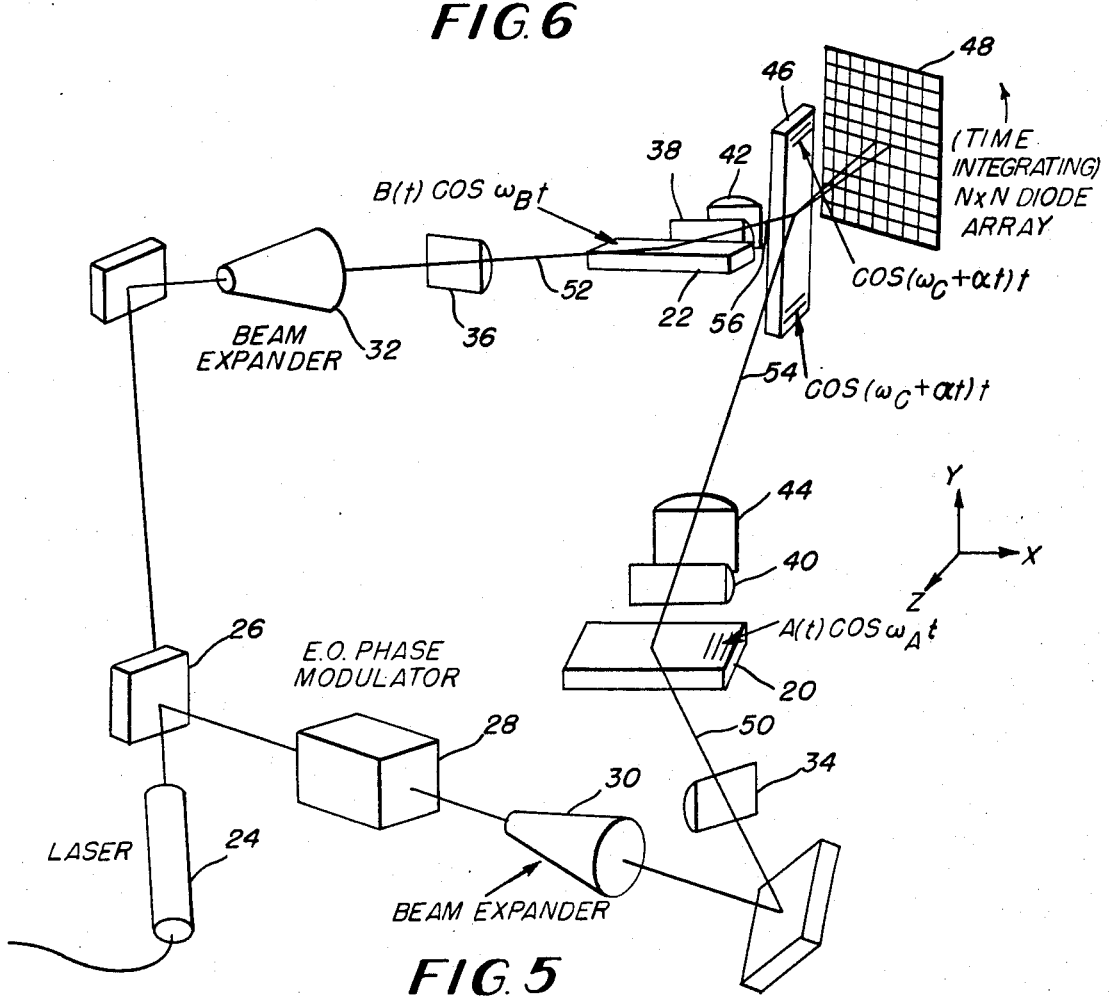
FIG. 5 is a schematic representation of an embodiment of the two-dimensional frequency scanning correlator of the present invention.

A proposed scheme for avoiding this problem, and at the same time determining the frequency offset between the reference and the input signal, is illustrated in FIG. 5. The reference signal, $A(t) \cos \omega_A t$, is input to a surface acoustic wave delay line 20 which is illuminated by a sheet beam of laser light. The signal to be detected, $B(t) \cos \omega_B t$ is input to a second surface acoustic wave delay line 22 which is illuminated by a sheet beam of light derived from the same laser 24. The laser beam is $$V(T,Z) = \int_{|Z|/v_a}^{T-|Z|/v_a} A\left(t + \frac{Z}{v_a}\right) A\left(t - \frac{Z}{v_a}\right) \cos\left[\frac{2Z}{v_a}(\omega_o - \omega_A - n_t e_\omega)\right] dt \quad (8)$$

$$n_t = 0, 1, 2 \ldots W - 1.$$

Here A(t) is the hopper amplitude (assumed constant), $\omega_A$ is the minimum frequency of the hopper, $e_\omega$ is the frequency spacing between adjacent discrete frequencies of the hopper, N is the number of discrete frequencies, and $n_t$ takes on all values from 0 to N−1 during the split by a beam splitter (26), and the respective resulting beams are phase equalized by E-O phase modulator 28, and are fed through beam expanders 30 and 32, and cylindrical lenses 34 and 36. The diffracted beams from the two delay lines can be described as $$L_A(t,X) = A\left(t + \frac{X}{v_a}\right) \cos\left([\omega_I - \omega_A]t + \frac{X}{v_a}[\omega_o - \omega_A]\right) \quad (12A)$$

and $$L_B(t,X) = B\left(t - \frac{X}{v_a}\right) \cos\left([\omega_I - \omega_B]t - \frac{X}{v_a}[\omega_o - \omega_B]\right) \quad (12B)$$

This light is compressed (focussed) in the X dimension by lenses 38 and 40, and expanded in the Y dimension by lenses 42 and 44, and is used to illuminate a third delay line 46. Thus, first, second, third and fourth beams, 50, 52, 54 and 56 are incident on the acousto-optic interaction means. The geometry is such that this third delay line 46 operates in the same manner as the one-dimensional time integrating correlator previously described. The inputs to this third delay line are identical chirps, cos ($\omega_c + \alpha t$)t, and the light diffracted by the counter-propagating surface acoustic waves generated by the chirps is expanded in the X dimension: This light can be described by $$L_A(t,X,Y) = A\left(t + \frac{X}{v_a}\right) \cos\left(\left[\omega_I - \omega_A - \omega_C - \alpha t + \frac{2\alpha Y}{v_a}\right]t + [\omega_o - \omega_A]\frac{X}{v_a} + \left[\omega_o - \omega_C - \frac{\alpha Y}{v_a}\right]\frac{Y}{v_a}\right) \quad (13A)$$

and $$L_B(t,X,Y) = B\left(t - \frac{X}{v_a}\right) \cos\left(\left[\omega_I - \omega_A - \omega_C - \alpha t + \frac{2\alpha Y}{v_a}\right]t - [\omega_o - \omega_B]\frac{X}{v_a} - \left[\omega_o - \omega_C + \frac{\alpha Y}{v_a}\right]\frac{Y}{v_a}\right) \quad (13B)$$

The two-dimensional detector diode array squares the sum of these two light beams, and the array output contains a term $$V(T,X,Y) = \qquad (14)$$

$$\int_{|X|/v_a + |Y|/v_a}^{T - (|X|/v_a + |Y|/v_a)} A\left(t + \frac{X}{v_a}\right) B\left(t - \frac{X}{v_a}\right) \cos\left(\left[\omega_B - \omega_A - \frac{4\alpha Y}{v_a}\right]t + \frac{X}{v_a}[2\omega_o - \omega_A - \omega_B] + \frac{2Y}{v_a}[\omega_o - \omega_C]\right) dt$$

Proper choice of the chirp rate $\alpha$ will guarantee that at some Y value ($Y_o$) the time variable part of the cosine time, $[\omega_B - \omega_A - 4\alpha Y/v_a]t$, will vanish, yielding $$V(T,X,Y_o) = \cos\left(\frac{X}{v_a}[2\omega_o - \omega_A - \omega_B] + \frac{2Y_o}{v_a}[\omega_o - \omega_C]\right) \int_{|X|/v_a + |Y_o|/v_a}^{T - (|Y_o|/v_a + |X|/v_a)} A\left(t + \frac{X}{v_a}\right) B\left(t - \frac{X}{v_a}\right) dt. \quad (15)$$

Thus, the cross-correlation of A(t) and B(t) is obtained in spite of the difference in carrier frequencies. In the Y dimension the output is the autocorrelation of the chirp cos ($\omega_c + \alpha t$)t. Hence, the frequency offset between $\omega_A$ and $\omega_B$ can be determined from the location of the correlation peak in the Y coordinate.

Figure 6:
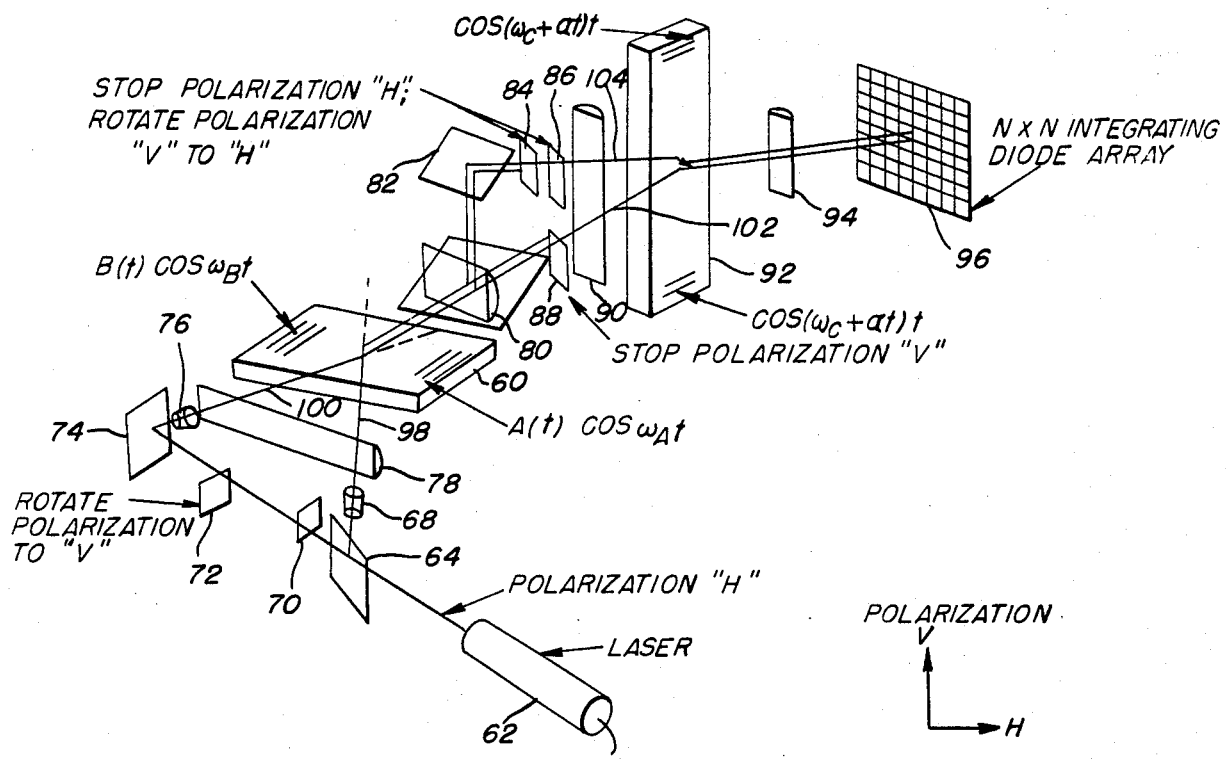
FIG. 6 is a schematic representation of a further embodiment of a frequency scanning correlator in accordance with the present invention.

FIG. 6 is directed to a further embodiment of the invention wherein a single acousto-optic device 60 is used instead of the two devices 20 and 22 in FIG. 5. In the embodiment of FIG. 6, two counter-propagating waves A(t) cos $\omega_A t$ and B(t) cos $\omega_B t$ are caused to traverse the crystal for interaction with respective light beams 98 and 100. In this embodiment, in order to ensure that the output beam from crystal 60 may be separated into two beams, one of which has information corresponding to only B(t) and not also A(t) and the other which has information corresponding to only A(t) and not also B(t), beams 98 and 100 have polarization which are rotated with respect to each other. Other than this feature, the principle operation of the embodiment of FIG. 6 is the same as of the embodiment of FIG. 5.

Referring to FIG. 6, laser 62 produces a beam which is polarized in the horizontal direction, and which is fed to beam splitter 64 which splits the beam into beam 98 which is fed through beam expander 68 and/or lens 78 to crystal 60, and into beam 100, which is fed through E-O phase modulator 70, polarization rotator 72, which rotates the horizontal polarization to a vertical polarization, mirror 74, beam expander 76, and cylindrical lens 78, to crystal 60. The diffracted beams are fed through beam splitting lens 80 which divides the beam into beams 102 and 104. Beam 102 is fed through vertical polarization stopper 88 to pass only light with information of A(t), and cylindrical lens 90, to crystal 92, while beam 104 is fed to mirror 82, horizontal polarization stopper 84 to pass only with information of B(t), vertical to horizontal polarization rotator 86, and cylindrical lens 90 to crystal 92. Thus, first, second, third and fourth beams 98, 100, 102, 104 traverse the acousto-optic means. The output of crystal 92 is fed through lens 94 to integrating diode array 96, which produces a signal indicative of the correlation, as in the case with the embodiment of FIG. 5.

Figure 7:
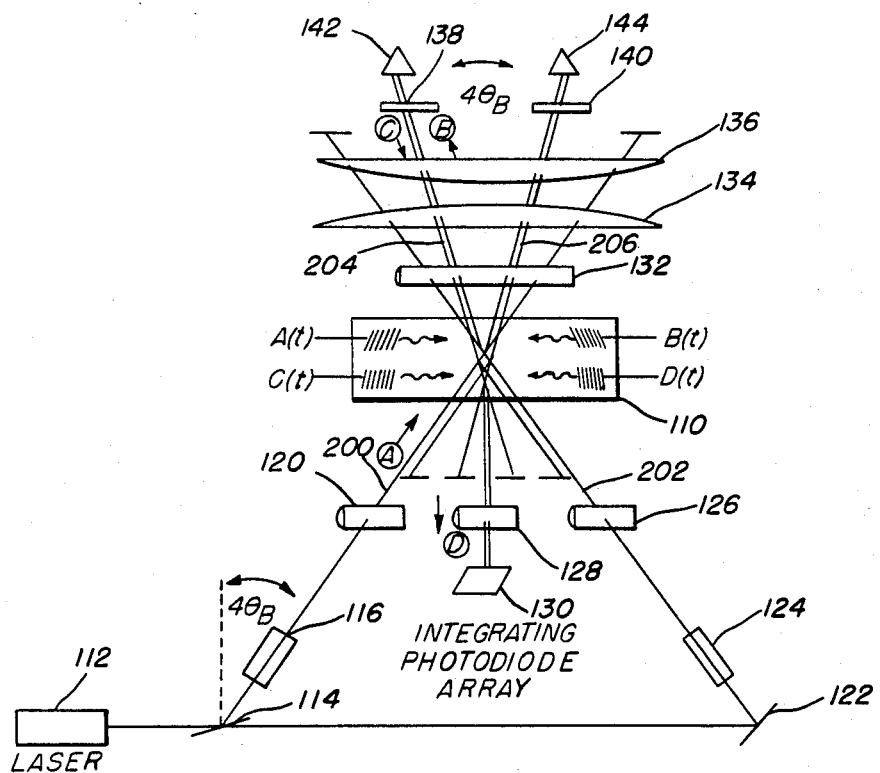
FIG. 7 is a schematic representation of a still further embodiment of a frequency scanning correlator in accordance with the present invention.

FIG. 7 illustrates a still further embodiment of the invention, which utilizes only a single acousto-optic device 110. In this embodiment, counter-propagating signals A(t) and B(t) correspond to the signals inputted to acousto-optic device 60 in the embodiment of FIG. 6, while the signals C(t) and D(t) are the chirp signals as in the previous embodiments. In FIG. 7, the transducers for A(t) and B(t) are each tilted by $2\theta_B$ while the transducers for C(t) and D(t) are each tilted by $\theta_B$.

The laser light on path A is diffracted by the surface acoustic wave generated by A(t) to path B. This is then rotated and returned along path C to be diffracted by a surface acousto-optic wave generated by C(t) to path D. The laser light is also diffracted by B(t) and D(t) in a similar fashion. As in the other embodiments, cylindrical lenses produce the required sheet beams for the acousto-optic interaction.

Referring to FIG. 7 in greater detail, laser 112 produces a coherent light beam which is split into two beams by beam splitter 114. One of these beams is fed through beam expander 116 and cylindrical lens 120 to acousto-optic interaction medium device 110 where it interacts with the A(t) wave while the other beam is reflected off of mirror 122 and fed through beam expander 124 and cylindrical lens 126 to the acousto-optic device where it interacts with wave B(t). The beam which interacted with A(t) is fed along path B through cylindrical lens 132 and cylindrical lens set 134, 136, and also through quarter wave plate 138 to complex prism 142 which reverses the direction of the beam and sends it back through quarter wave plate 138 and the lenses to interact with wave C(t). The quarter wave plate is necessary to keep light polarization vertical because the complex prism rotates the image and polarization by 90°.

The beam diffracted by wave C(t) is fed through cylindrical lens 128 to integrating photodiode array 130. Similarily, the other beam inputted to crystal 110 interacts with wave B(t), is fed through the lenses and quarter wave plate, is reversed by prism 144, and again traverses the crystal, this time interacting with wave D(t), and is fed through cylindrical lens 128 to integrating photodiode array 130. In this embodiment, first, second, third and fourth beams, 200, 202, 204 and 206, respectively, are incident on the acousto-optic interaction means. Also, beam stops for the undiffracted beams are shown in FIG. 7, and as known to those skilled in the art, would be present in the other embodiments as well. Except for the different optical configuration, the principle of operation of the embodiment of FIG. 7 is the same as that of the embodiment of FIG. 5.

An application for which the frequency scanning correlator of the invention is especially useful is low probability of intercept (LPI) radar.

LPI radar requires transmitted signals with both low spectral power density and low absolute power. Spread-spectrum signals and signals like FM chirps spread the signal power over large bandwidths. The processing gain of the matched filters or correlators which can be used to receive such signals greatly reduces the transmitted power required to detect a target at a given range. The vary large processing gains that can be achieved with the two-beam correlator (perhaps 60 db) could allow a substantial reduction in the required transmitted power, as current technology limits matched filters to time-bandwidth products of about $10^4$. Most correlation receivers have been extremely limited in the relative time variation between reference signal and received signal over which the correlation peak can be detected, making them unsuitable for radar signal processing. On the other hand, the relatively large time aperture of the two-beam correlator gives a large range window over which the return signal can be processed, and the range location of the window can be easily changed by delaying the correlator reference input.

Another limitation on the use of correlators as radar signal processors has been the limitation on usable processing gain due to Doppler frequency shift. Equation 11 suggests that a correlator's output degrades significantly when the frequency difference between the reference signal and the received signal exceeds $\pi$ divided by the equivalent integration time of the correlator. A 10-GHz radar would experience Doppler shifts of about 9-kHz for radial target velocities of 500 km/hr, and use of standard superhetrodyne receiver techniques would give this same frequency shift at the correlator input. This would limit the useful correlator integration time to about 330 $\mu$s, yielding a time-bandwidth product (for a 30-MHz processor bandwidth) of about $10^4$. By using the two-dimensional frequency scanning correlator of the invention, it will be possible to achieve long integration time and large processing gain even when large Doppler frequency shifts exist on the return radar signal carrier.

Figure 8:
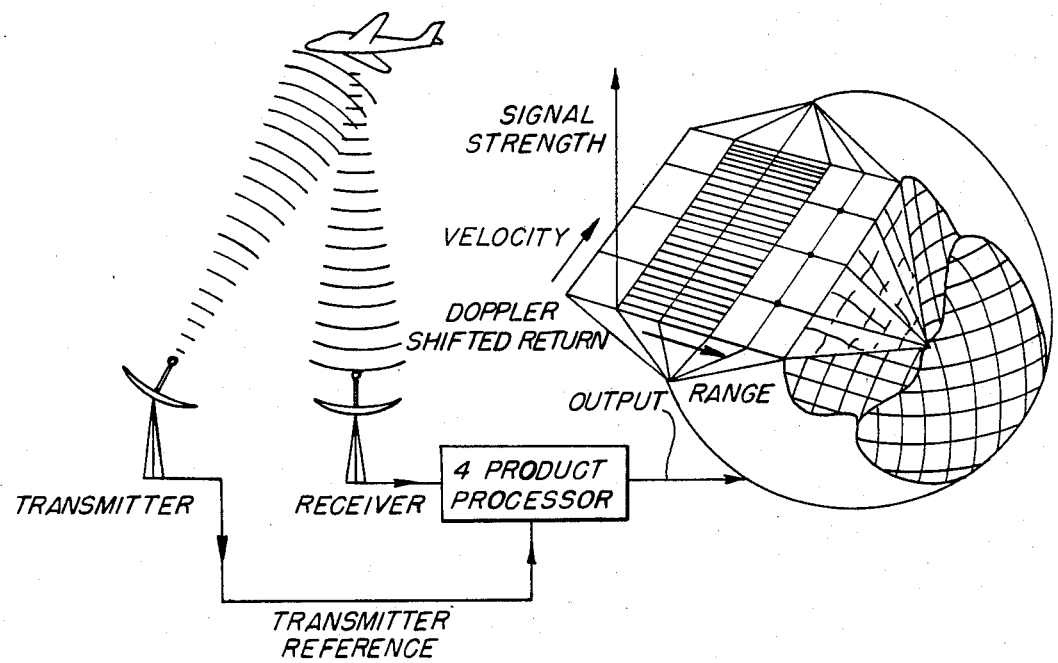
FIG. 8 is a schematic representation of a proposed LPI radar system.

FIG. 8 illustrates a proposed LPI radar system based on using such a processor. A direct sequence spread-spectrum signal is transmitted on a 10-GHz carrier, and the return signal is processed in the correlator. The two-dimensional output of the correlator detector array contains unambiguous range information (TDOA) on one axis, and unambiguous radial velocity (Doppler) information on the other axis. Processing gains exceeding 60 dB (30-ms transmitted word duration) should be achieveable, along with 2-m range resolution and 2-km/hr velocity resolution. The required transmitter power could be as low as 200 mW for successful target detection at a 10 mile range.

There, thus have been described three embodiments of the acousto-optic frequency scanning correlator according to the invention. It is noted that while the invention has been described with respect to counter-propagating chirp signals, these may be replaced by two generalized signals $C(t) \cos \omega_c t$ and $D(t) \cos \omega_d t$ to form a four product two-dimensional signal processor.

Further, we wish it to be understood that we do not desire to be limited to the exact details of construction shown and described for obvious modifications can be made by a person skilled in the art.

We claim:

1. A two-dimensional frequency scanning correlator for correlating first and second signals which are shifted in frequency or time with respect to each other, comprising:

acousto-optic interaction means for defracting light by sound;

first, second, third and fourth acoustic transducer means disposed on said acousto-optic interaction means for converting electrical signals to sound;

means for applying first and second modulated carrier high frequency A.C. signals respectively to said first and second transducer means, the modulation of said first A.C. signal corresponding to said first electrical signal and the modulation of said second A.C. signal corresponding to said second electrical signal;

means for applying third and fourth high frequency A.C. signals respectively to said third and fourth transducer means;

laser means for providing a coherent light beam, from which first, second, third and fourth coherent light beams are derived;

means for directing said first and second light beams across said acousto-optic interaction means for interaction respectively with said first and second A.C. signals in a first dimension of an orthogonal coordinate system;

means for directing said third and fourth light beams across said acousto-optic interaction means for interacting respectively with said third and fourth A.C. signals in a second dimension which is perpendicular to said first dimension;

time integrating photodetector means for detecting the interference of the light beams;

means for directing beams derived from said third and fourth beams at said photodetector means after said third and fourth beams interact with said third and fourth A.C. signals; and wherein said acousto-optic interaction means is comprised of first, second and third discrete acousto-optic interaction media elements, said first and second elements having said first and second modulated carrier A.C. signals respectively applied thereto, and said third element having said third and fourth A.C. signals applied thereto.

2. The correlator of claim 1, wherein said acousto-optic elements are elongated crystals, and wherein said acoustic transducer means cause acoustic signals corresponding to said first and second A.C. signals to propagate respectively across said first and second elements in the direction of length and cause said third and fourth A.C. signals to counter-propagate across said third element in the direction of the length.

3. The correlator of claim 2, further including means for compressing said first and second beams in the direction of the length of said first and second crystals and for expanding them in a direction perpendicular to the direction of the length after passage across said first and second elements, to form said third and fourth beams respectively, which are incident on said third element.

4. A two-dimensional frequency scanning correlator for correlating first and second signals which are shifted in frequency or time with respect to each other, comprising:

acousto-optic interaction means for defracting light by sound;

first, second, third and fourth acoustic transducer means disposed on said acousto-optic interaction means for converting electrical signals to sound;

means for applying first and second modulated carrier high frequency A.C. signals respectively to said first and second transducer means, the modulation of said first A.C. signal corresponding to said first electrical signal and the modulation of said second A.C. signal corresponding to said second electrical signal;

means for applying third and fourth high frequency A.C. signals respectively to said third and fourth transducer means;

laser means for providing a coherent light beam, from which first, second, third and fourth coherent light beams are derived;

means for directing said first and second light beams across said acousto-optic interaction means for interaction respectively with said first and second A.C. signals in a first dimension of an orthogonal coordinate system;

means for directing said third and fourth light beams across said acousto-optic interaction means for interacting respectively with said third and fourth A.C. signals in a second dimensional which is perpendicular to said first dimension;

time integrating photodetector means for detecting the interference of the light beams;

means for directing beams derived from said third and fourth beams at said photodetector means after said third and fourth beams interact with said third and fourth A.C. signals; and wherein said acousto-optic interaction means is comprised of first and second discrete acousto-optic interaction media elements, said first element having said first and second modulated carrier A.C. signals applied thereto, and said second element having said third and fourth A.C. signals applied thereto.

5. The correlator of claim 4, wherein said acousto-optic elements are elongated crystals and wherein said acoustic transducer means cause said first and second A.C. signals to counter-propagate across said first element in the direction of length and cause said third and fourth signals to counter-propagate across said second element in the direction of length.

6. The correlator of claim 5 including means for polarizing said coherent light beam produced by said laser means further including means for rotating the plane of polarization of said first and second beams with respect to each other.

7. A two-dimensional frequency scanning correlator for correlating first and second signals which are shifted in frequency or time with respect to each other, comprising;

acousto-optic interaction means for defracting light by sound;

first, second, third and fourth acoustic transducer means disposed on said acousto-optic interaction means for converting electrical signals to sound;

means for applying first and second modulated carrier high frequency A.C. signals respectively to said first and second transducer means, the modulation of said first A.C. signal corresponding to said first electrical signal and the modulation of said second A.C. signal corresponding to said second electrical signal;

means for applying third and fourth high frequency A.C. signals respectively to said third and fourth transducer means;

laser means for providing a coherent light beam, from which first, second, third and fourth coherent light beams are derived;

means for directing said first and second light beams across said acousto-optic interaction means for interaction respectively with said first and second A.C. signals in a first dimension of an orthogonal coordinate system;

means for directing said third and fourth light beams across said acousto-optic interaction means for interacting respectively with said third and fourth A.C. signals in a second dimension which is perpendicular to said first dimension;

time integrating photodetector means for detecting the interference of the light beams;

means for directing beams derived from said third and fourth beams at said photodetector means after said third and fourth beams interact with said third and fourth A.C. signals; and wherein said acousto-optic interaction means is comprised of a single acousto-optic interaction media element, said element having said first, second, third and fourth A.C. signals applied thereto, said element comprising an elongated crystal said acoustic transducer means causing said first and second signals to counter-propagate across said crystal in the direction of length.

8. The correlator of claim 7, wherein said third beam is derived from said first beam by reversing its direction after passage across said acoustic-optic interaction media element and causing it to again pass across said element, and wherein said fourth beam is derived from said second beam by reversing its direction after passage across said element and causing it to again pass across said element.

* * * * *